United States Patent Office 3,489,780
Patented Jan. 13, 1970

3,489,780
SECONDARY PHOSPHINE DERIVATIVES OF TRANSITION METAL CARBONYLS
David Thomas Thompson, Runcorn, England, assignor to Imperial Chemical Industries Limited, London, England, a corporation of Great Britain
No Drawing. Filed July 24, 1967, Ser. No. 655,276
Claims priority, application Great Britain, Aug. 2, 1966, 34,740/65, 20,724/67; Feb. 10, 1967, 6,429/67; Feb. 23, 1967, 8,736/67; Mar. 2, 1967, 9,991/67
Int. Cl. C07f 11/00, 15/02
U.S. Cl. 260—429     1 Claim

ABSTRACT OF THE DISCLOSURE

Transition metal carbonyl derivatives containing in the molecule at least one ligand of the general formula

—ER$_2$X where E is phosphorus, arsenic or antimony, R is a hydrocarbon or substituted hydrocarbon radical, and X is a halogen or hydrogen atom. The compounds have utility as intermediates in preparing dinuclear and polynuclear complexes which function as hydrogenation catalysts.

---

This invention relates to metal carbonyl derivatives containing organic phosphine, arsine or stibine ligands.

It is known that tertiary phosphines, such as triphenyl phosphine, react with certain transition metal carbonyl compounds resulting in the replacement of one or more carbonyl groups with tertiary phosphine ligands. For example, iron pentacarbonyl and triphenylphosphine may be reacted to give a mixture of triphenylphosphineiron tetracarbonyl and bis(triphenylphosphine) iron tricarbonyl (W. Reppe and W. J. Schweckendiek, Ann. Chem. 560 (1948) 104).

We have now found that secondary phosphines are also capable of replacing carbonyl groups. By the term "secondary phosphine" we mean a compound of the type

ER$_2$X where E=phosphorus, arsenic or antimony, R=a hydrocarbon radical or substituted hydrocarbon radical, and X is a halogen or hydrogen atom. The products of such replacement reactions are useful intermediates for further chemical reactions, since the labile atom X is retained in the product.

According to the present invention we provide transition metal carbonyl derivatives containing in the molecule at least one ligand of general formula

—ER$_2$X where E, R and X have the meanings ascribed above. Suitable metals are transition metals within Groups V to VIII of the Periodic Table. By the "Periodic Table" we mean the long Periodic Table of the Elements, as shown inside the back cover of "General and Inorganic Chemistry" by Partington, published by MacMillan, 2nd edition.

Although phosphorus, arsenic and antimony-containing ligands may be incorporated in the compounds of my invention, in view of the greater cost and toxicity and the lower stability of arsines and stibines, the use of phosphorus-containing ligands is preferred. For the sake of convenience, the invention will hereafter be illustrated by reference to the phosphorus derivatives only, but whenever a phosphorus atom is indicated it may be replaced by an arsenic or antimony atom.

When X is a halogen atom, it is preferably chlorine, bromine or iodine.

My transition metal carbonyl derivatives include compounds which may be described by the general formulae:

$$M(CO)_nPR_2X \quad (I)$$
$$M(CO)_n(PR_2X)_m \quad (II)$$
$$M(CO)_n(PR_2X)_m(L)_p \quad (III)$$

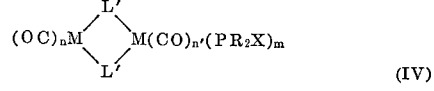
(IV)

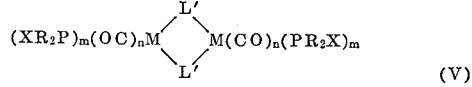
(V)

where M represents a transition metal atom, and where there are two or more such atoms in a compound, they may be the same or different, L' represents a bridging ligand, L represents a substituent ligand which may be neutral or ionic other than CO or PR$_2$X and again, if there is more than one such ligand, all may be the same or different, n, n', m and p represent integers, which in combination satisfy the co-ordination requirements of the appropriate metal atom or atoms. Also included are compounds of the type shown in formulas IV and V which contain metal to metal bonds.

Compounds of the invention may be prepared by contacting a substituted or unsubstituted mono- or polynuclear transition metal carbonyl with a phosphine, arsine or stibine of the general formula:

ER$_2$X

By the term "substituted carbonyl" I mean a carbonyl containing the metal and carbonyl groups together with other ligands, for example cycloheptadienyl, phosphine, or halogen ligands.

Suitable transition metal carbonyls include the carbonyls and substituted carbonyls of iron, tungsten, molybdenum, chromium and rhodium e.g., Fe(CO)$_5$, W(CO)$_6$, Mo(CO)$_6$, Cr(CO)$_6$, and bridged carbonyls such as

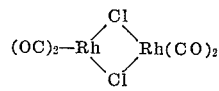

Preferred compounds of the formula ER$_2$X are diphenylphosphine and diphenylchlorophosphine.

The preparation is preferably carried out in an inert solvent, such as benzene or butanol, at temperatures between −20 and 250° C., though higher or lower temperatures may be used if desired. Pressures up to 100 atmospheres or higher may be used: but conveniently the reaction is performed in a sealed vessel at the autogenous pressure of the mixture.

In view of the reactivity of some of the reactants, particularly the halophosphines, it is desirable to avoid the presence of air and water. In such cases the reactions may be carried out under an inert gas such as nitrogen.

The products may be crystallised from suitable solvents by conventional techniques.

Compounds of the invention are useful as intermediates in the preparation of dinuclear and polynuclear transition metal complexes. by reaction with other transition metal compounds. Without prejudice to the invention, it is believed that this behaviour is due to the presence of the reactive halogen or hydrogen atom in the substituent group.

The invention is illustrated by, but not limited to the following examples.

EXAMPLE 1

Diphenylchlorophosphinechromium pentacarbonyl was prepared from chromium hexacarbonyl (5.0 g.) and diphenylchlorophosphine (5.0 g.). The reactants were dissolved in toluene (10 ml.) under nitrogen, sealed in an evacuated tube and heated to 170° C. for 12 hours. Evaporation of the solvent under reduced pressure gave the product as bright yellow crystals (3.1 g., 33%) M.P. 56° C. Infra-red (nujol) bands at 1945(s), 2010(m) cm.$^{-1}$.

EXAMPLE 2

Diphenylchlorophosphinemolybdenum pentacarbonyl was prepared by dissolving acetonitrilemolybdenum pentacarbonyl (prepared from 2.0 g. Mo(CO)$_6$ in boiling acetonitrile) in tetrahydrofuran (50 ml.) under nitrogen and adding diphenylchlorophosphine (1 equiv.) Small amount of insoluble material was removed by filtration and the mother liquor evaporated under reduced pressure. Chromatography on alumina and recrystallisation from light petroleum (B.P. 40–60°) gave the product (0.74 g., 21%) as yellow crystals M.P. 57°. Infra-red (nujol) bands at 1970 (Vs., b.) and 2040 (m.) cm.$^{-1}$.

EXAMPLE 3

Diphenylchlorophosphinetungsten pentacarbonyl was prepared from tungsten hexacarbonyl (5.0 g.) and diphenylchlorophosphine (2.0 g.). The reactants were dissolved in toluene (10 ml.) under nitrogen, sealed in an evacuated tube and heated to 170° C. for 12 hours. Evaporation of the solvent under reduced pressure and recrystallisation from light petroleum (B.P. 40–60°) with the addition of activated charcoal gave the product as bright yellow crystals (2.24 g., 24%) M.P. 62° C. Infra-red (nujol) bands at 1960 (s., b.) and 2030 cm.$^{-1}$ (w.)

EXAMPLE 4

Bis (diphenylchlorophosphine)molybdenum tetracarbonyl was prepared from bicycloheptadienemolybdenum tetracarbonyl (2.0 g.) and diphenylchlorophosphine (3.0 g.) in benzene (150 ml.) under nitrogen at 0–20°. Solvent was removed under reduced pressure and the residue recrystallised from light petroleum (B.P. 80–100°) to give the product (1.44 g., 29%) M.P. 99°. Infra-red bands (nujol) at 1905 (s.), 1940 (s.), 1960 (s.) and 2010 (m.) cm.$^{-1}$.

EXAMPLE 5

Diphenylphosphineiron tetracarbonyl, Fe(CO)$_4$PPh$_2$H was prepared by heating together iron pentacarbonyl (14.5 ml.) and diphenylphosphine (20.2 g.) in butanol (160 ml.) under nitrogen in an autoclave at 170° for 6 hours. A pale yellow solid (3.5 g.) was removed by filtration and the filtrate cooled to give the product (22.2 g. 58%) as yellow needles M.P. 75°.

Analysis.—Found: C, 55.3%; H, 3.2%; P, 9.1%. C$_{16}$H$_{11}$FeO$_4$P requires: C, 54.3%; H, 3.1%; P, 8.7%.

Infra-red spectrum $\nu_{CO}$ (nujol) 1950, 1990, 2060 cm.$^{-1}$.
$\nu$P-H 2350 cm.$^{-1}$.

Proton magnetic resonance

Spectrum shows phosphorus hydrogen at 3.17$\tau$; J($_P{}^{31}{}_{-H}$)=335 c./s.

EXAMPLE 6

Diphenylphosphinechromium pentacarbonyl was prepared from chromium hexacarbonyl (2×5.06 g.) and diphenylphosphine (2×3.8 g.). The reactants were dissolved in toluene (3×10 ml.) under nitrogen, sealed in evacuated tubes and heated to 140° for 12 hours. Evaporation of the solvent under reduced pressure and recrystallisation of the residues from methanol gave the product (11.4 g., 66%) as pale yellow needles, M.P. 54°.

Analysis.—Found: C, 54.1%; H, 3.0%; P, 7.7%. C$_{17}$H$_{11}$CrO$_5$P requires: C, 54.0%; H, 2.9%; P, 8.2%.

Infra-red spectrum $\nu_{CO}$ (nujol) 1910(s), 1950, 1990(s), 2010 cm.$^{-1}$
$\nu$P-H 2270 cm.$^{-1}$ Proton magnetic resonance Spectrum shows phosphorus hydrogen at 3.6$\tau$; J($_P{}^{31}{}_{-H}$)=340 c./s.

EXAMPLE 7

Diphenylphosphinemolybdenum pentacarbonyl,

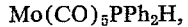

was prepared from molybdenum hexacarbonyl (3× 5 g.) and diphenylphosphine (3× 3.5 g.). The reactants were dissolved in toluene (3× 10 ml.) under nitrogen, sealed in evacuated tubes and heated at 160–170° for 48 hrs. The insoluble material was removed by filtration and the filtrate treated with activated charcoal and evaporated under reduced pressure. Recrystallisation from methanol gave the product (10.9 g., 43%) as needles, M.P. 73–75°.

Analysis.—Found: C, 48.2%; H, 2.95%; P, 7.85%. C$_{17}$H$_{11}$MoO$_5$P requires: C, 48.5%; H, 2.6%; P, 7.4%.

Infra-red spectrum $\nu_{CO}$ (nujol) 1960, 2000, 2020 cm.$^{-1}$
$\nu$P-H 2290 cm.$^{-1}$ Proton magnetic resonance Spectrum shows phosphorus hydrogen at 3.53$\tau$; J($_P{}^{31}{}_{-H}$)=332 c./s.

EXAMPLE 8

Diphenylphosphinetungsten pentacarbonyl,

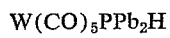

was prepared from tungsten hexacarbonyl (5.04 g.) and diphenylphosphine (2.63 g.). The reactants were heated in benzene under nitrogen in an evacuated sealed tube at 140–150° for 12 hrs. Removal of solvent and recrystallisation from toluene-light petroleum gave the product (5.28 g., 72%) as prisms M.P. 65°. Further recrystallisation from methanol gave pure product, M.P. 90–92°.

Analysis.—Found: C, 40.0%; H, 2.3%; P, 6.1%. C$_{17}$H$_{11}$O$_5$PW requires: C, 40.0%; H, 2.2%; P, 6.1%.

Infra-red spectrum $\nu_{CO}$ (nujol) 1915 (s), 1955, 2055 cm.$^{-1}$
$\nu$P-H 2345 cm.$^{-1}$ Proton magnetic resonance Spectrum shows phosphorus hydrogen at 3.24$\tau$; J($_P{}^{31}{}_{-H}$)=343 c./s.

EXAMPLE 9

Bicyclohepta-2,5-dienemolybdenum tetracarbonyl (3.0 g.) was dissolved in benzene (100 ml.), cooled in ice water, and a solution of diphenylphosphine (3.92 g.) in benzene (50 ml.) was added slowly. After stirring for 3 hours, the solvent was removed under reduced pressure, and the residue recrystallised from petroleum ether (B.P. 40–60° C.) to give the product, bis(diphenylphosphine) molybdenum tetracarbonyl (2.68 g., 46% yield) as buff prisms, M.P. 96–98° C.

EXAMPLE 10

Cycloheptatrienemolybdenum tricarbonyl (3.25 g.) and diphenylphosphine (7.1 g.) were refluxed in benzene (150 ml.) for 30 minutes. On cooling, activated charcoal was added and after filtration, the solvent was removed under reduced pressure. Recrystallisation from a benzene/light petroleum mixture gave the product, tris(diphenylphosphine) molybdenum tricarbonyl as purple platelets (6.69 g., 70% yield) M.P. 140–150° C.

EXAMPLE 11

$\mu,\mu'$-Dichlororhodium tetracarbonyl was dissolved in benzene to give a yellow solution. Two equivalents of diphenylphosphine were added and the mixture was stirred under nitrogen at room temperature. A red-brown solution form from which the solid was precipitated by addition of petroleum ether.

*Analysis.*—Found: C, 42.67; H, 3.39; Cl, 8.39; P, 7.84. Calculated: C, 44.2; H, 3.0; Cl, 10.0; P, 8.8

The calculated figure is for a compound of the formula:

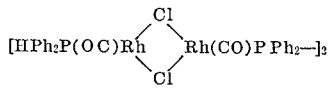

What I claim is:

1. As compositions of matter diphenylchlorophosphinechromium pentacarbonyl, diphenylphosphineiron tetracarbonyl, diphenyl chlorophosphinemolybdenum pentacarbonyl, diphenylchlorophosphinetungsten pentacarbonyl, diphenylphosphinechromium pentacarbonyl, diphenylphosphinemolybdenum pentacarbonyl, diphenylphosphinetungsten pentacarbonyl, bis(diphenylchlorophosphine) molybdenum tetracarbonyl, bis(diphenylphosphine) molybdenum tetracarbonyl, tris(diphenylphosphine) molybdenum tricarbonyl and the compound having the structural formula:

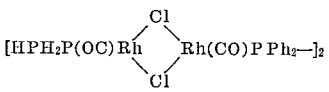

References Cited

Benlian et al., Bull. Soc. Chim., 1963, p. 1583-8.

Theubert, Doctoral dissertation, Munich, Germany. 1961, p. 12.

Abel et al., J. Chem. Soc. 1959, p. 2323-7.

DELBERT E. GANTZ, Primary Examiner

A. P. DEMERS, Assistant Examiner

U.S. Cl. X.R.

260—438.5